(12) United States Patent
Maruta (10) Patent No.: US 11,518,189 B2
(45) Date of Patent: Dec. 6, 2022

(54) HUB STRUCTURE

(71) Applicant: KABUSHIKI KAISHA TOYOTA JIDOSHOKKI, Kariya (JP)

(72) Inventor: Yuki Maruta, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 440 days.

(21) Appl. No.: 16/715,227

(22) Filed: Dec. 16, 2019

(65) Prior Publication Data

US 2020/0189315 A1 Jun. 18, 2020

(30) Foreign Application Priority Data

Dec. 17, 2018 (JP) .............................. JP2018-235024

(51) Int. Cl.
| | |
|---|---|
| *F16C 19/38* | (2006.01) |
| *F16C 19/56* | (2006.01) |
| *B60B 27/02* | (2006.01) |
| *B60B 27/00* | (2006.01) |
| *F16C 19/36* | (2006.01) |
| *F16C 33/76* | (2006.01) |
| *F16C 19/54* | (2006.01) |

(52) U.S. Cl.
CPC ............ *B60B 27/02* (2013.01); *B60B 27/001* (2013.01); *B60B 27/0073* (2013.01); *F16C 19/364* (2013.01); *F16C 19/386* (2013.01); *F16C 19/543* (2013.01); *F16C 19/56* (2013.01); *F16C 33/763* (2013.01); *B60B 2380/14* (2013.01); *B60B 2380/64* (2013.01); *B60B 2380/76* (2013.01); *B60B 2900/113* (2013.01); *B60B 2900/115* (2013.01); *F16C 2326/02* (2013.01)

(58) Field of Classification Search
CPC ... B60B 27/0073; B60B 27/001; B60B 27/02; B60B 2380/76; F16C 19/364; F16C 19/386; F16C 19/56; F16C 33/763; F16C 33/7813; F16C 2226/12; F16C 2326/02; F16C 19/543
See application file for complete search history.

(56) References Cited

U.S. PATENT DOCUMENTS

| | | | | |
|---|---|---|---|---|
| 5,757,084 | A | * | 5/1998 | Wagner ................... B60B 27/02 29/898.07 |
| 6,200,037 | B1 | * | 3/2001 | Braun ................. F16C 33/6659 384/466 |
| 2007/0052284 | A1 | * | 3/2007 | White ....................... B60B 7/14 301/108.1 |

FOREIGN PATENT DOCUMENTS

| | | | | |
|---|---|---|---|---|
| CN | 108944260 A | * | 12/2018 | ........... B60B 27/001 |
| DE | 4420486 A1 | * | 12/1995 | ......... B60B 27/0005 |
| JP | 09-272305 A | | 10/1997 | |

(Continued)

*Primary Examiner* — Phillip A Johnson
(74) *Attorney, Agent, or Firm* — Sughrue Mion, PLLC (57) ABSTRACT

A hub structure includes an axle housing, a hub having an insertion hole in a vehicle width direction through which the axle housing is inserted, and an inner bearing disposed between the hub and the axle housing in the insertion hole and rotatably supporting the hub with respect to the axle housing, and an oil seal disposed between the hub and the axle housing in the insertion hole on an inner side relative to the inner bearing in the vehicle width direction. A spacer is provided between the inner bearing and the oil seal in the insertion hole. The spacer has an outer end surface that is contactable with an inner end surface of an inner race of the inner bearing.

6 Claims, 7 Drawing Sheets

(56) References Cited

FOREIGN PATENT DOCUMENTS

JP  2008-044460 A  2/2008
JP  2013-139857 A  7/2013

\* cited by examiner

HUB STRUCTURE

CROSS REFERENCE TO RELATED APPLICATION

This application claims priority to Japanese Patent Application No. 2018-235024 filed on Dec. 17, 2018, the entire disclosure of which is incorporated herein by reference.

BACKGROUND ART

The present disclosure relates to a hub structure, in particular, a hub structure having an axle housing and a hub rotatable around the axle housing.

As an example of conventional arts related to the hub structure, a hub structure disclosed in Japanese Patent Application Publication No. 2008-44460 is known. The hub structure disclosed in the above Publication has a hub that includes a housing accommodating portion into which an axle housing is inserted. The hub is rotatably supported by the axle housing via an inner bearing. Inside the hub, a ring-shaped spacer is disposed to support the inner bearing with respect to the hub. The spacer includes a ring-shaped retaining portion, and a ring-shaped flange portion projected from the outer peripheral surface of the retaining portion. The retaining portion is fitted into the housing accommodating portion of the hub, and the flange portion is fitted to an opening end surface of the hub on the inner side of the vehicle in the width direction. An attachment member is detachably attached to the inner-side portion of the hub so as to cover the opening end surface of the hub on the inner side of the vehicle. A packing is interposed between the attachment member and the axle housing to prevent a bearing lubricant between the hub and the axle housing from leaking out.

According to the hub structure disclosed in the above Publication, a rotational body retainer and the inner race of the inner bearing are retained by the spacer. This prevents the inner race of the inner bearing from displacing from the hub to fall off, which eliminates the necessity for an operator to keep holding the inner race by the hand during insertion of the axle housing into the housing accommodating portion of the hub. This also eliminates a pressing operation to the hub for supporting the inner bearing with respect to the hub. This facilitates assembling the hub and the axle housing and improves the workability of the assembly operation.

However, the hub structure disclosed in the above Publication requires the attachment member, which increases the number of components, and also requires a space to provide the attachment member. If a space for the hub structure is limited, the hub structure disclosed in the above Publication cannot be employed. A desirable hub structure even under the condition of a limited space for a hub structure is therefore a hub structure that is easy to assemble and disassemble and that uses a small number of components without requiring the attachment.

The present disclosure has been made in view of the above circumstances and is directed to providing a hub structure that is easier to assemble and disassemble even when the space for the hub structure is limited.

SUMMARY

In accordance with an aspect of the present disclosure, there is provided a hub structure including an axle housing, a hub having an insertion hole in a vehicle width direction through which the axle housing is inserted, an inner bearing disposed between the hub and the axle housing in the insertion hole and rotatably supporting the hub with respect to the axle housing, and an oil seal disposed between the hub and the axle housing in the insertion hole, on an inner side relative to the inner bearing in the vehicle width direction. A spacer is provided between the inner bearing and the oil seal in the insertion hole. The spacer has an outer end surface that is contactable with an inner end surface of an inner race of the inner bearing.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

First Embodiment

A hub structure according to a first embodiment of the present disclosure will now be described in detail with reference to the accompanying drawings. The hub structure of the first embodiment is an example applied to a front axle of a forklift as an industrial vehicle, provided with a wet brake.

Figure 1:
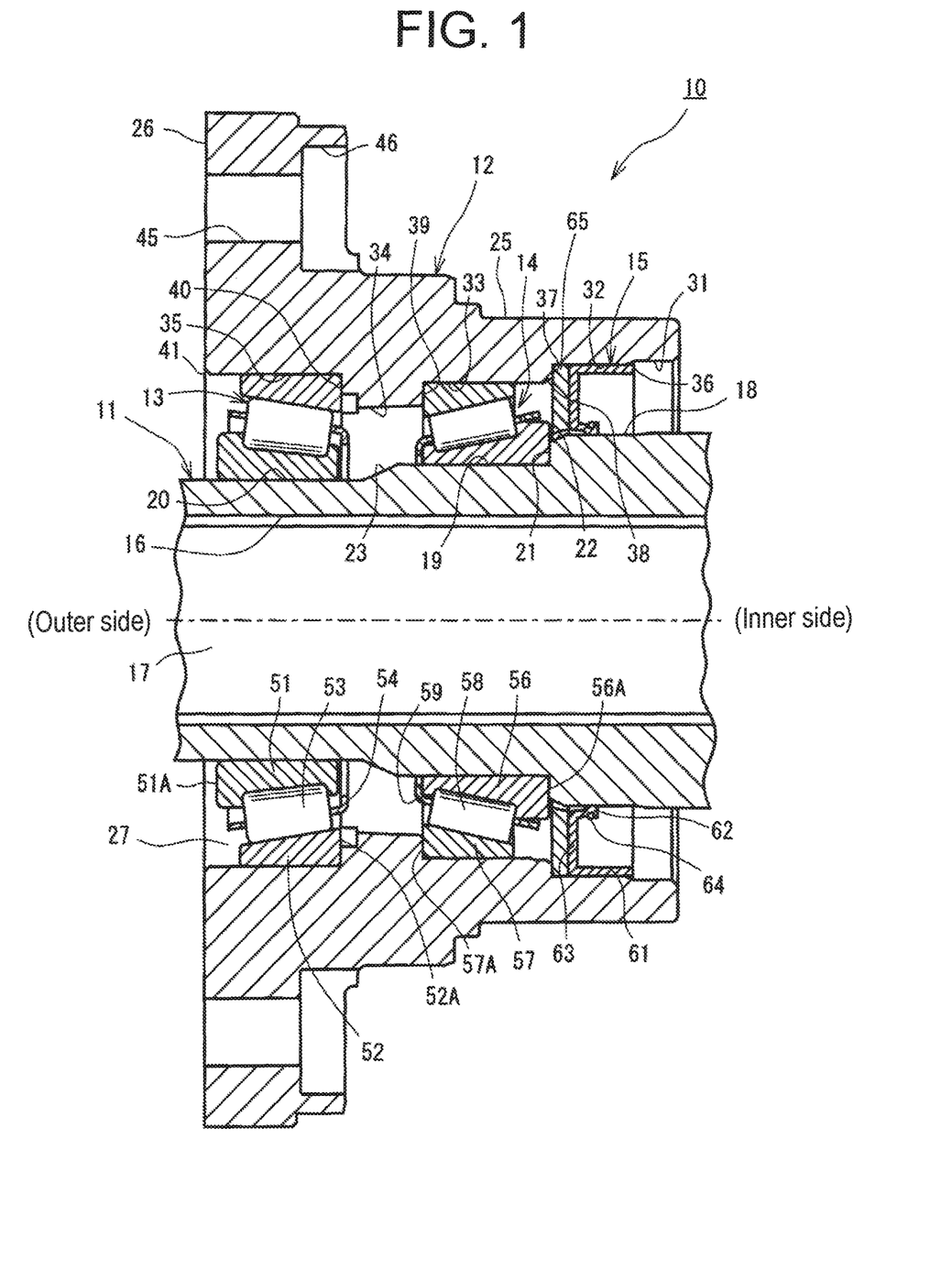
FIG. 1 is a longitudinal sectional view showing a hub structure according to a first embodiment of the present disclosure.

A hub structure 10 shown in FIG. 1 includes a cylindrical axle housing 11 that extends in the vehicle width direction, a rotatable hub 12 that includes a wheel (not shown), and an outer bearing 13 and an inner bearing 14 that rotatably support the hub 12 with respect to the axle housing 11. The hub structure 10 also includes an oil seal 15 that prevents a lubricant from leaking out.

An inner end portion (not shown) of the axle housing 11, located on the center side of the forklift in the width direction, is fixed to the vehicle body (not shown). An outer end portion of the axle housing 11, opposite to the inner end portion, projects toward the outer side of the forklift in the width direction. The axle housing 11 has an axle-shaft insertion hole 16 through which an axle shaft 17 is inserted. A direction of an axial center P of the axle-shaft-insertion hole 16 coincides with the vehicle width direction. The illustrations of the axle-shaft insertion hole 16 and the axle shaft 17 in the drawings are simplified for convenience of explanation.

The axle housing 11 includes a plurality of outer peripheral surfaces in the vehicle width direction. Specifically, the axle housing 11 includes a first outer peripheral surface 18, a second outer peripheral surface 19, and a third outer peripheral surface 20, in this order from the inner side to the outer side of the forklift in the width direction. The outer diameter of the axle housing 11 differs at these outer peripheral surfaces. The outer diameter of the axle housing 11 is the largest at the first outer peripheral surface 18, the second largest at the second outer peripheral surface 19, and the third largest at the third outer peripheral surface 20. A step peripheral surface 21 is formed between the first outer peripheral surface 18 and the second outer peripheral surface 19, extending in a direction perpendicular to the axial center P. A chamfered peripheral surface 22 is formed on the first outer peripheral surface 18 on a side of the step peripheral surface 21. A tapered peripheral surface 23 of which the outer diameter decreases toward the outer side of the forklift is formed between the second outer peripheral surface 19 and the third outer peripheral surface 20.

The hub 12 includes a tubular body 25, and a flange body 26 extending to the radially outer peripheral surface of the hub 12 at the outer end portion of the tubular body 25, and also, an insertion hole 27 through which the axle housing 11 is inserted. The hub inner-peripheral wall forming the insertion hole 27 includes a plurality of inner peripheral surfaces in the vehicle width direction. Specifically, the hub 12 includes a first inner peripheral surface 31, a second inner peripheral surface 32, a third inner peripheral surface 33, a fourth inner peripheral surface 34, and a fifth inner peripheral surface 35, in this order from the inner side to the outer side of the forklift in the width direction. The inner diameter of the hub 12 differs at these inner peripheral surfaces.

The inner diameter of the hub 12 is the largest at the first inner peripheral surface 31, the second largest at the second inner peripheral surface 32, the third largest at the fifth inner peripheral surface 35, and the fourth largest at the third inner peripheral surface 33. The inner diameter of the hub 12 at the fourth inner peripheral surface 34 is the smallest. A first tapered peripheral surface 36 is formed between the first inner peripheral surface 31 and the second inner peripheral surface 32. The inner diameter of the hub 12 slightly increases at the first tapered peripheral surface 36 from the inner side toward the outer side of the forklift. A first step peripheral surface 37 is formed between the second inner peripheral surface 32 and the third inner peripheral surface 33. A chamfered peripheral surface 38 is formed on the third inner peripheral surface 33 on a side of the first step peripheral surface 37. A second step peripheral surface 39 is formed between the third inner peripheral surface 33 and the fourth inner peripheral surface 34. A third step peripheral surface 40 is formed between the fourth inner peripheral surface 34 and the fifth inner peripheral surface 35. A chamfered peripheral surface 41 is formed on the fifth inner peripheral surface 35 on the outer side of the forklift.

The flange body 26 of the hub 12 has a bolt hole 45 through which a bolt (not shown) is inserted to attach the wheel (not shown) to the hub 12. A recessed portion 46 to accommodate the bolt head is formed on the inner surface of the flange body 26. The axle housing 11 is inserted through the insertion hole 27 of the hub 12. The hub 12 is supported rotatably around the axle housing 11 via the outer bearing 13 and the inner bearing 14 which are disposed between the hub 12 and the axle housing 11 in the insertion hole 27.

The outer bearing 13 and the inner bearing 14 will now be described. The outer bearing 13 is disposed in the insertion hole 27 on the outer side of the forklift in the width direction, and the inner bearing 14 is disposed in the insertion hole 27 on an inner side relative to the outer bearing 13 in the vehicle width direction.

The outer bearing 13 is a tapered roller bearing, and includes an inner race 51, an outer race 52, rolling elements (rollers) 53, and a retainer 54. The rolling elements 53 are retained in the inner race 51 by the retainer 54. The inner race 51 is detachable from the outer race 52. The outer race 52 is press-fitted into the insertion hole 27 of the hub 12, and retained in the hub 12 in contact with the fifth inner peripheral surface 35. An inner end surface 52A, i.e. an inner end surface of the outer race 52, is in contact with the third step peripheral surface 40. The outer bearing 13 is mounted in such a manner that the axial centers of the rolling elements 53 extend closer to a radial center of the axle shaft in a direction toward the inner side from the outer side of the forklift in the width direction. The inner race 51 is mounted on the third outer peripheral surface 20 of the axle housing 11 with a clearance fit. An outer end surface 51A i.e., an end surface of the inner race 51 on the outer side of the forklift, projects further toward the outer side than the outer end surface of the outer race 52 in the vehicle width direction.

Figure 2:
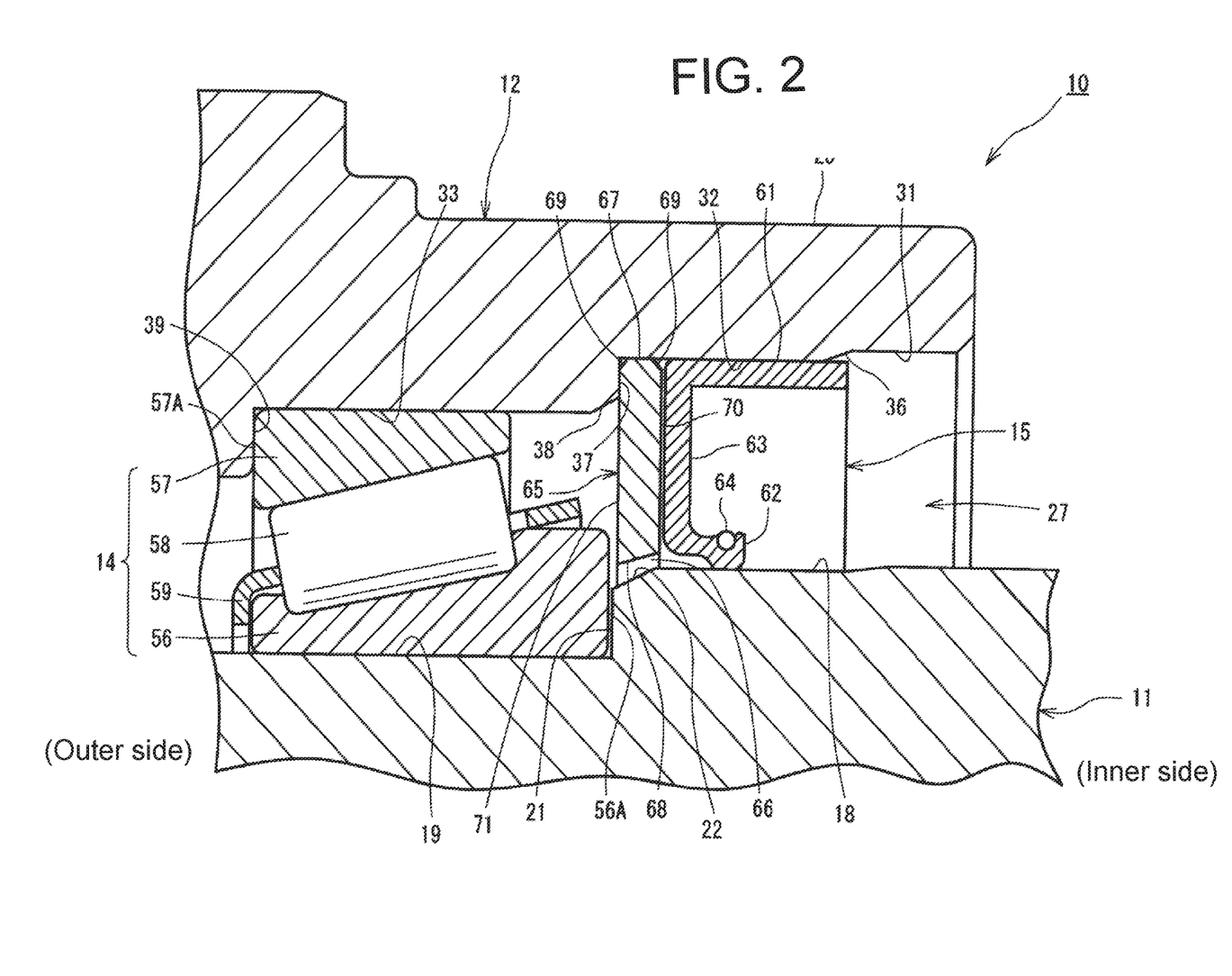
FIG. 2 is an enlarged cross-sectional view of a section around a spacer in the hub structure.

The inner bearing 14 is a tapered roller bearing, and includes an inner race 56, an outer race 57, rolling elements (rollers) 58, and a retainer 59. The rolling elements 58 are retained in the inner race 56 by the retainer 59. The inner race 56 is detachable from the outer race 57. The outer race 57 is press-fitted into the insertion hole 27 of the hub 12, and retained in the hub 12 in contact with the third inner peripheral surface 33. An outer end surface 57A i.e., an outer end surface of the outer race 57, is in contact with the second step peripheral surface 39, as shown in FIGS. 1 and 2. The inner bearing 14 is mounted in such a manner that the axial centers of the rolling elements 58 extend further from the radial center of the axle shaft in a direction toward the inner side from the outer side of the forklift in the width direction. The inner race 56 is mounted on the second outer peripheral surface 19 of the axle housing 11 with the clearance fit. An inner end surface 56A i.e., an end surface of the inner race 56 on the inner side of the forklift, projects further toward the inner side than the inner end surface of the outer race 57 in the vehicle width direction, in contact with the step peripheral surface 21.

The oil seal 15 will now be described. The oil seal 15 is provided on an inner side of the inner bearing 14 in the width direction of the forklift. The oil seal 15 includes an outer annular portion 61, an inner annular portion 62, and an intermediate connection portion 63. The outer annular portion 61 is an annular portion having an outer peripheral surface that is in contact with the second inner peripheral surface 32 of the hub 12. The inner annular portion 62 is an annular portion having a lip that is in sliding contact with the first outer peripheral surface 18 of the axle housing 11. The intermediate connection portion 63 is a portion connecting one end portion of the outer annular portion 61 with the inner annular portion 62. Therefore, the oil seal 15 exhibits an L-shaped cross-section. The oil seal 15 is formed of a rubber-based material for flexibility, and includes a metal reinforcement member (not shown) extending from the outer annular portion 61 across to the intermediate connection portion 63 of the oil seal 15, and an annular ring 64 in the inner annular portion 62 to impart a tightening force to the lip. The outer surface of the inner annular portion 62 has a flat surface perpendicular to the axial center P. The oil seal 15 prevents a lubricant of the wet brake (not shown), which is provided on an inner side relative to the hub 12 in the vehicle width direction, from leaking out to the outer side in the width direction of the forklift (to a side of the inner bearing 14).

Figure 3:
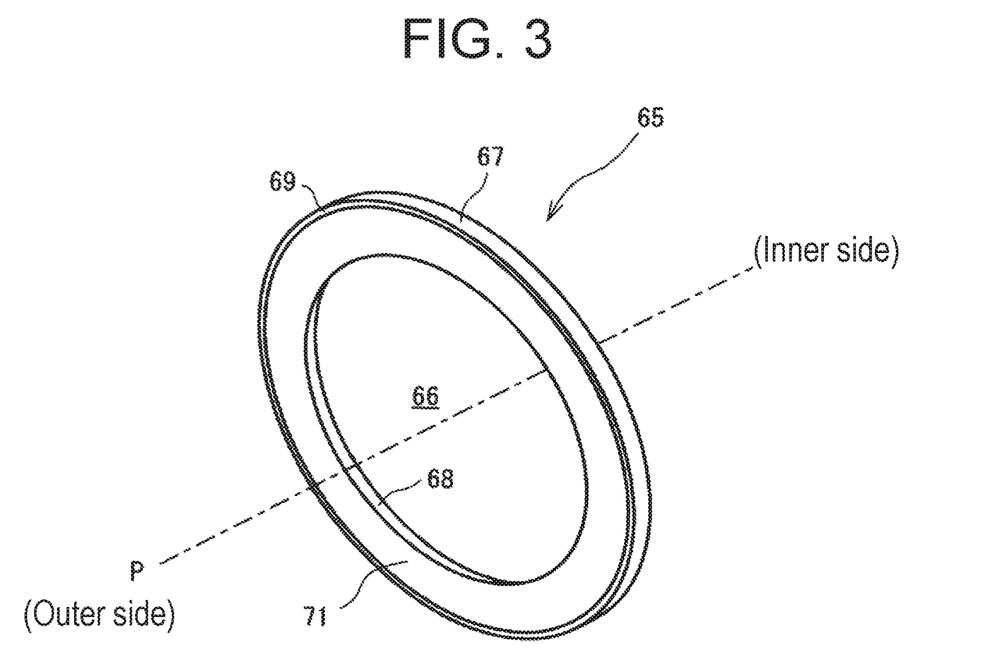
FIG. 3 is a perspective view of the spacer included in the hub structure.

In the first embodiment, a spacer 65 is provided between the inner bearing 14 and the oil seal 15 in the vehicle width direction. As shown in FIG. 3, the spacer 65 is a ring body having a through hole 66. As shown in FIG. 2, an inner end surface 70 i.e., one end surface of the spacer 65, is a surface facing the oil seal 15, and an outer end surface 71 i.e., the other end surface of the spacer 65, is a surface facing the inner bearing 14. The outer peripheral surface 67 of the spacer 65 is in contact with the second inner peripheral surface 32, and an inner peripheral surface 68 of the spacer 65 is at a position that is closer to the axial center P than the outer peripheral surface of the inner race 56 of the inner bearing 14. The spacer 65 is fitted to the hub 12 in the insertion hole 27 with a clearance fit. The outer peripheral surface 67 of the spacer 65 is thus in contact with the second inner peripheral surface 32. On the other hand, the spacer 65 is movable in the vehicle width direction with respect to the hub 12 when the spacer 65 is subjected to a load in the vehicle width direction. Since a clearance between the oil seal 15 and the first step peripheral surface 37 in the insertion hole 27 is slightly greater than the thickness of the spacer 65, the range in which the spacer 65 is movable is small.

The inner peripheral surface 68 is sloped along the chamfered peripheral surface 22 of the axle housing 11, but does not extend in parallel with the outer peripheral surface 67 and the axial center P. Since the inner peripheral surface 68 is sloped along the chamfered peripheral surface 22, the area of the spacer 65 in contact with the inner race 56 is increased as compared with the case where the inner peripheral surface extends in parallel with the axial center P. A chamfered peripheral surface 69 is formed on each of both ends of the outer peripheral surface 67, one on the side of the inner end surface 70 of the spacer 65 and the other on the side of the outer end surface 71 of the spacer 65. Even when a chamfer (not shown) is formed on the corner of the second inner peripheral surface 32 and the first step peripheral surface 37, the corner of the hub 12 on a side of the first step peripheral surface 37 does not contact with the chamfered peripheral surface 69 of the spacer 65 on a side of the outer peripheral surface 67. Thus, a load is not locally applied to the spacer 65.

The assembly of the hub structure 10 of the first embodiment will now be described. The inner bearing 14, the spacer 65, and the oil seal 15 are assembled to the hub 12. First, an operator inserts the outer race 57 of the inner bearing 14 into the insertion hole 27 from the first inner peripheral surface 31 toward the third inner peripheral surface 33, and press-fits the outer race 57 to the hub 12. The outer end surface 57A of the outer race 57 comes in contact with the second step peripheral surface 39, by which the outer race 57 is positioned in the vehicle width direction.

The operator, while integrating the inner race 56 provided with the rolling elements 58 and the retainer 59 with the outer race 57, inserts the spacer 65 through the insertion hole 27 until the spacer 65 comes in contact with the first step peripheral surface 37, to mount the spacer 65 to the hub 12. Although the outer peripheral surface 67 of the spacer 65 is in contact with the second inner peripheral surface 32 of the hub 12, the spacer 65 is fitted to the hub 12 with the clearance fit. In a state where the spacer 65 is in contact with the first step peripheral surface 37, the portion of the spacer 65 near the inner peripheral surface 68 is located to maintain a slight clearance from the inner end surface 56A of the inner race 56.

Subsequently, the operator mounts the oil seal 15 in the hub 12. The outer annular portion 61 of the oil seal 15 comes in contact with the second inner peripheral surface 32. The oil seal 15 is inserted and press-fitted into the insertion hole 27 until the spacer 65 is pressed against the first step peripheral surface 37. Since the oil seal 15 is press-fitted into the hub 12, the oil seal 15 gets immovable from the hub 12.

In a state where the oil seal 15 is mounted in the hub 12, the spacer 65 is fixed between the first step peripheral surface 37 of the hub 12 and the oil seal 15. Since the inner bearing 14 is a tapered roller bearing, the inner race 56 integrally provided with the rolling elements 58 and the retainer 59 may structurally fall off from the outer race 57. However, since the spacer 65 is provided to prevent the inner race 56 from falling off, the spacer 65 interferes with and stops the inner race 56 from falling off.

Figure 4:
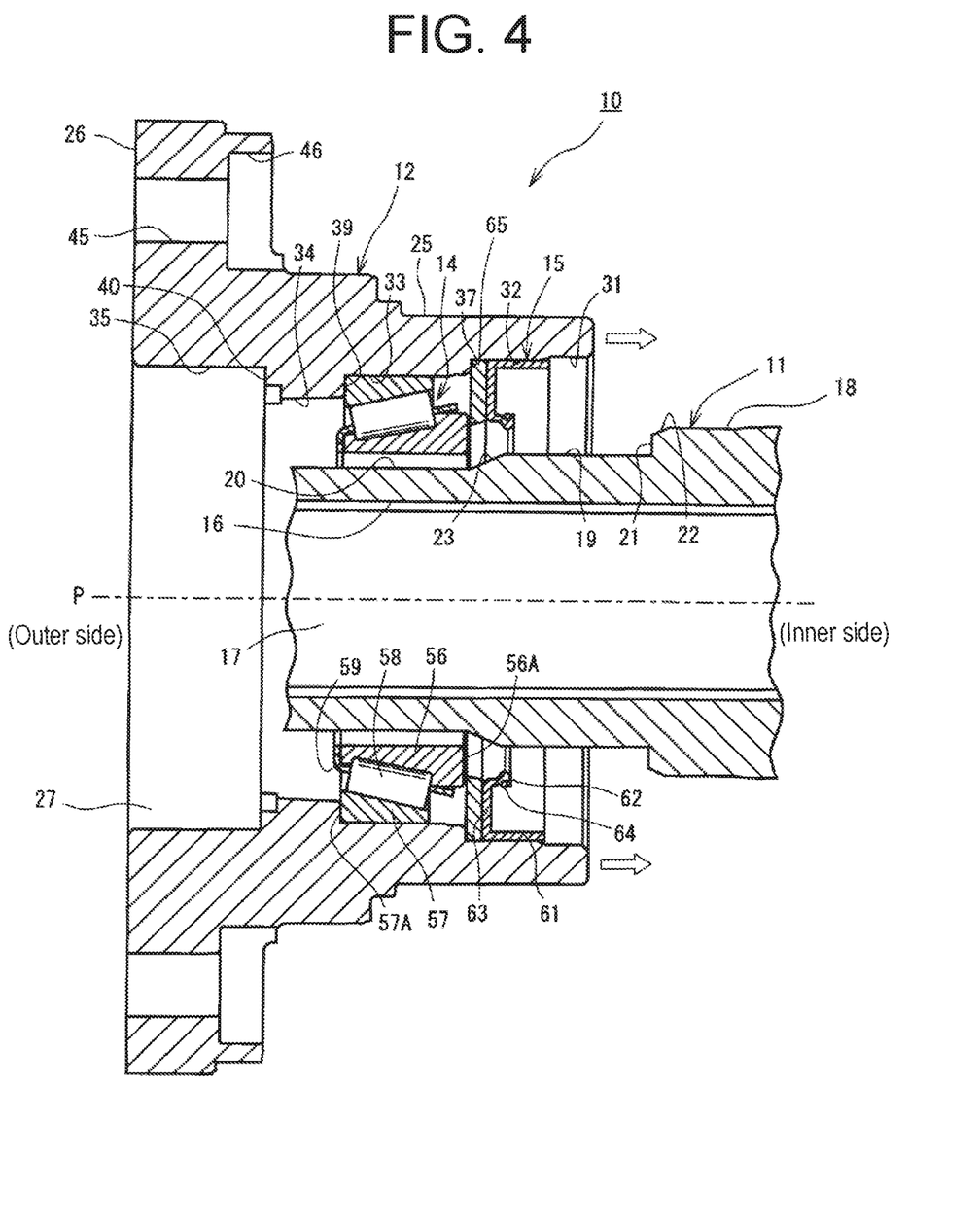
FIG. 4 is an explanatory view illustrating the assembly of the hub structure according to the first embodiment.

Then, the operator assembles the hub 12, into which the inner bearing 14, the spacer 65, and the oil seal 15 are already assembled, to the axle housing 11. As shown in FIG. 4, the operator moves the hub 12 from the outer side toward the inner side of the forklift in such a manner that the axle housing 11 is inserted into the insertion hole 27 of the hub 12. In FIG. 4, the moving direction of the hub 12 is indicated with a white arrow. The hub 12 is moved until the inner race 56 of the inner bearing 14 comes in contact with the step peripheral surface 21 of the axle housing 11. The inner race 56 is mounted in the axle housing 11 with the clearance fit. The assembly of the hub 12 with the axle housing 11 allows the inner annular portion 62 of the oil seal 15 to be in sliding contact with the first outer peripheral surface 18 of the axle housing 11. (See FIG. 1.)

In the first embodiment, although the inner race 56 wobbles on the outer race 57 until the inner peripheral surface of the inner race 56 is fitted to the second outer peripheral surface 19 of the axle housing 11, the inner race 56 does not fall off from the outer race 57. In this state, an operator does not have to hold the inner race 56 by the hand to prevent the inner race 56 from falling off from the outer race 57, unlike the conventional hub structures in which the inner race 56 may fall off from the outer race 57. The operator is thereby allowed to concentrate on positioning the axial center P of the inner race 56 with the axial center P of the axle housing 11, without being distracted with attention paid to prevent the inner race 56 from falling off. As a result, workability of assembling the hub 12 is improved, which facilitates the assembly operation of the hub 12.

After completion of the assembly of the hub 12 with the axle housing 11, the operator mounts the outer bearing 13 between the axle housing 11 and the hub 12. First, the operator mounts the outer race 52 of the outer bearing 13 in the hub 12 by press-fitting. Then, the operator press-fits to mount the inner race 51, which is integrally provided with the rolling elements 53 and the retainer 54, in the axle housing 11. Press-fitting the outer race 52 of the outer bearing 13 to the hub 12 may be performed at the same timing as press-fitting the outer race 57 of the inner bearing 14 to the hub 12.

Figure 5:
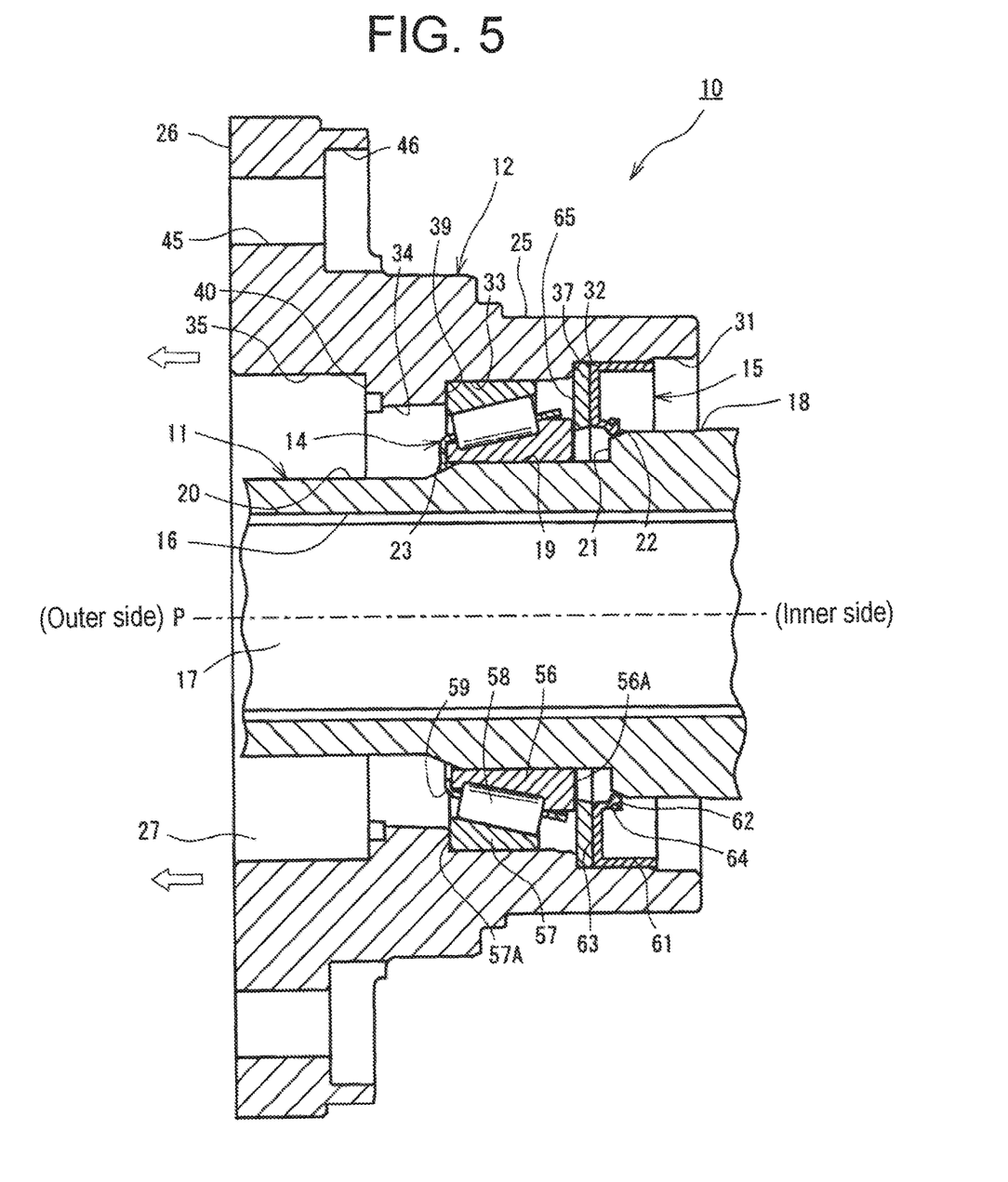
FIG. 5 is an explanatory view illustrating the disassembly of the hub structure according to the first embodiment.

The disassembly of the hub structure 10 of the first embodiment will now be described. First, the operator brings the hub 12 into a removable state from the axle housing 11. Then, as shown in FIG. 5, the operator moves the hub 12 toward the outer side of the forklift in the width direction so that the hub 12 is ready to be pulled out of the axle housing 11. In FIG. 5, the moving direction of the hub 12 is indicated with a white arrow. For convenience of explanation, the outer bearing 13 is not shown in FIG. 5.

When the hub 12 is moved toward the outer side of the forklift in the width direction, the outer race 57 of the inner bearing 14 also moves with the hub 12. The oil seal 15 press-fitted into the hub 12, and the spacer 65, move with the hub 12. As the hub 12 moves, the spacer 65 comes in contact with and presses against the inner end surface 56A of the inner race 56 of the inner bearing 14. Since the frictional force generated by press-fitting the oil seal 15 is greater than the frictional force generated by clearance-fitting the inner race 56 mounted in the axle housing 11, the inner race 56 provided with the rolling elements 58 and the retainer 59 of the inner bearing 14 moves in the direction that the inner race 56 is pulled out of the axle housing 11 (toward the outer side of the forklift).

When the spacer 65 presses against the inner race 56 while the hub 12 is being pulled out of the axle housing 11, the inner end surface 70 of the spacer 65 and the outer surface of the intermediate connection portion 63 of the oil seal 15 come in surface-to-surface contact with each other. The load from the spacer 65 is thereby received by the entire outer surface of the intermediate connection portion 63 of the oil seal 15. In other word, the corner portion of the inner race 56 and the retainer 59 do not interfere with the oil seal 15 while the hub 12 is being pulled out, which prevents the oil seal 15 from receiving any excessive local load, and from damaging.

By pulling out the hub 12, the inner race 56 pressed against the spacer 65 is removed from the axle housing 11. Then, hub 12 is removed from the axle housing 11.

The hub structure 10 of the first embodiment offers the following operational effects.

(1) The spacer 65 provided between the inner bearing 14 and the oil seal 15 in the insertion hole 27 prevents the inner race 56 included in the inner bearing 14 from falling off while the hub 12 that contains the inner bearing 14 and the oil seal 15 is assembled to the axle housing 11. This facilitates the assembly of the hub 12. Since the spacer 65 is provided between the inner bearing 14 and the oil seal 15, the retainer 59 of the inner bearing 14 and the corner portion of the inner race 56 do not directly contact with the oil seal 15 when the hub 12 is removed from the axle housing 11. This enables the hub 12 to be easily removed and disassembled from the axle housing 11 without damaging the oil seal 15.

(2) Since the spacer 65 is the ring body having the through hole 66, the shape of the spacer 65 is simplified. This allows fabricating the spacer 65 to be relatively easier, and as a result, the fabrication cost of the hub structure 10 may be reduced. Since the spacer 65 is the ring body, the spacer 65 contacts with the oil seal 15 all around in the circumferential direction while the hub 12 is pulled out. This allows the oil seal 15 to be more impervious to a local load from the spacer 65.

(3) The spacer 65 is fitted to the hub 12 with the clearance fit. When the inner race 56 is fitted with the clearance fit, the oil seal 15 moving with the hub 12 presses against the spacer 65, and the spacer 65 then presses against the inner race 56. This allows the inner race 56 to be easily removed from the axle housing 11 without removing the oil seal 15. When the inner race 56 is fitted with an interference fit, not the clearance fit, the spacer 65 is moved by the inner race 56 of the inner bearing 14 and pressed against the oil seal 15 while the hub 12 is removed from the axle housing 11 because the inner race 56 remains in the axle housing 11. By being pressed against by the spacer 65, the oil seal 15 may be easily removed from the hub 12, even without being damaged.

(4) The oil seal 15 includes the outer annular portion 61, the inner annular portion 62, and the intermediate connection portion 63. The outer annular portion 61 is to be in contact with the hub inner-peripheral wall that forms the insertion hole 27. The inner annular portion 62 is to be in sliding contact with the outer peripheral wall of the axle housing 11. The intermediate connection portion 63 connects one end portion of the outer annular portion 61 with one end portion of the inner annular portion 62. The spacer 65 is oriented in such a manner that the spacer 65 is contactable with the intermediate connection portion 63. This enables the hub 12 to be removed from the axle housing 11 without damaging the oil seal 15 even when the spacer 65 comes in contact with the intermediate connection portion 63 because the the surfaces of the spacer 65 and the intermediate connection portion 63 are in surface-to-surface contact with each other.

(5) The inner peripheral surface 68 is sloped along the chamfered peripheral surface 22 of the axle housing 11, but does not extend in parallel with the outer peripheral surface 67 and the axial center P. Since the inner peripheral surface 68 is sloped along the chamfered peripheral surface 22, the area of the spacer 65 in contact with the inner race 56 is increased as compared with the case where the inner peripheral surface extends in parallel with the axial center P. Therefore, the spacer 65 securely prevents the inner race 56 from falling off while the hub 12 is assembled. The inner peripheral surface 68 that does not extend in parallel with the outer peripheral surface 67 allows an operator to easily identify the assembling orientation of the spacer 65.

(6) The chamfered peripheral surface 69 is formed on each of the both ends of the outer peripheral surface 67, one on the side of the inner end surface 70 of the spacer 65 and the other on the side of the outer end surface 71 of the spacer 65. Even when a chamfer (not shown) is formed on the corner of the second inner peripheral surface 32 and the first step peripheral surface 37, the corner of the hub 12 on the side of the first step peripheral surface 37 does not contact with the chamfered peripheral surface 69 of the spacer 65 on the side of the outer peripheral surface 67. Thus, a load is not locally applied to the spacer 65. This prevents the spacer 65 from being damaged.

Second Embodiment

A hub structure according to a second embodiment of the present disclosure will now be described. The hub structure of the second embodiment is different from the hub structure of the first embodiment in the structures of the hub and the spacer. In the description of the second embodiment below, descriptions of configurations identical with those of the first embodiment of the present disclosure described above will be provided with the identical reference numerals.

Figure 6:
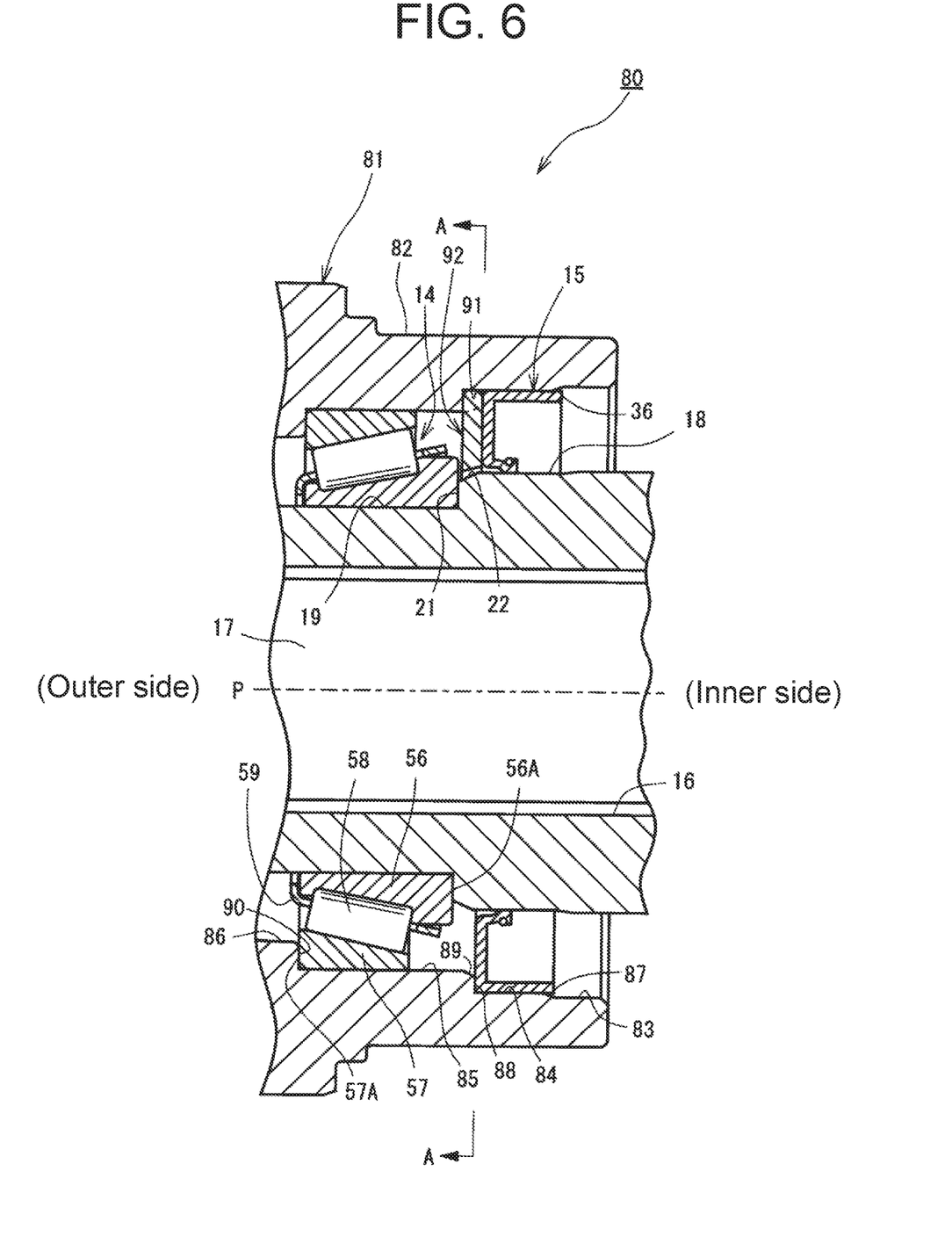
FIG. 6 is a longitudinal section view showing a hub structure according to a second embodiment of the present disclosure.

In a hub structure 80 of the second embodiment as shown in FIG. 6, a hub 81 includes a tubular body 82, and a flange body (not shown) extending toward the radially outer peripheral surface of the hub 81 at the outer end portion of the tubular body 82. The above flange body (not shown) corresponds to the flange body 26 of the first embodiment. The inner peripheral wall of the hub 81, forming the insertion hole 27, includes a plurality of inner peripheral surfaces in the vehicle width direction. Specifically, the hub 81 includes a first inner peripheral surface 83, a second inner peripheral surface 84, a third inner peripheral surface 85, a fourth inner peripheral surface 86, and a fifth inner peripheral surface (not shown), in this order from the inner side to the outer side of the forklift in the width direction. The fifth inner peripheral surface (not shown) corresponds to the fifth inner peripheral surface 35 of the first embodiment. The inner diameter of the hub 81 differs at these inner peripheral surfaces.

The inner diameter of the hub 81 is the largest at the first inner peripheral surface 83, the second largest at the second inner peripheral surface 84, the third largest at the fifth inner peripheral surface (not shown), and the fourth largest at the third inner peripheral surface 85. The inner diameter at the fourth inner peripheral surface 86 is the smallest. A first tapered peripheral surface 87 is formed between the first inner peripheral surface 83 and the second inner peripheral surface 84. The inner diameter of the first tapered peripheral surface 87 slightly increases from the inner side toward the outer side of the forklift. A first step peripheral surface 88 is formed between the second inner peripheral surface 84 and the third inner peripheral surface 85. A chamfered peripheral surface 89 is formed on the third inner peripheral surface 85 on a side of the first step peripheral surface 88. A second step peripheral surface 90 is formed between the third inner peripheral surface 85 and the fourth inner peripheral surface 86. A third step peripheral surface (not shown) is formed between the fourth inner peripheral surface 86 and the fifth inner peripheral surface. A chamfered peripheral surface (now shown) is formed on the fifth inner peripheral surface on the outer side of the forklift. The third step peripheral surface and the chamfered peripheral surface that are not shown correspond to the third step peripheral surface 40 and the chamfered peripheral surface 41 of the first embodiment, respectively.

Figure 7:
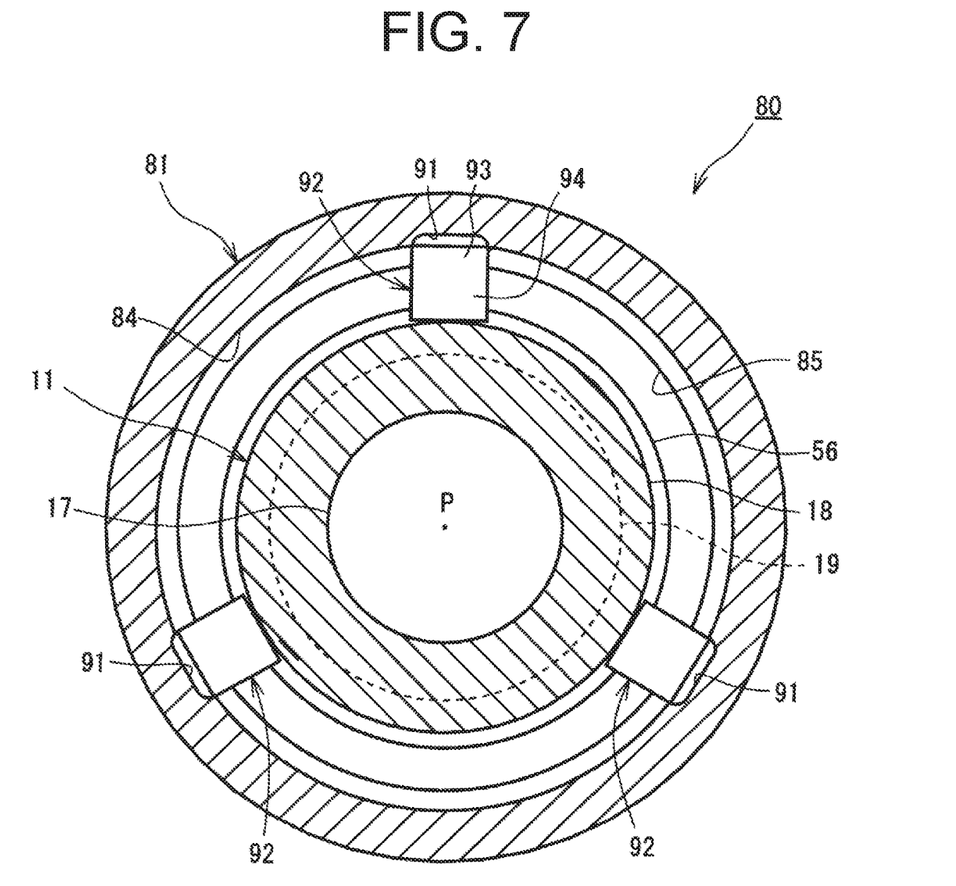
FIG. 7 is a cross-sectional view taken along a line A-A of FIG. 6.

In the second embodiment, the oil seal 15 is mounted in the hub 81 in such a manner that the oil seal 15 comes in contact with the first step peripheral surface 88. As shown in FIG. 7, grooves 91 are formed at three positions on the third inner peripheral surface 85 in the circumferential direction. The grooves 91 are formed at regular intervals in the circumferential direction of the third inner peripheral surface 85. The length of each of the grooves 91 in the vehicle width direction is slightly greater than the thickness of a spacer 92 described below, and the inner end portion of each of the grooves 91 is opened on a side of the second inner peripheral surface 84. The depth of each of the grooves 91 in the radial direction is substantially equal to the depth of the second inner peripheral surface 84.

The spacer 92 has a shape fittable in each of the grooves 91, specifically, a substantially cubic shape. The spacer 92 has an inserting portion 93 that is inserted into each of the grooves 91 and a protruding portion 94 that projects from each of the grooves 91 towards the radial center side of the axle shaft. As shown in FIG. 6, the end of the protruding portion 94 is disposed close to the chamfered peripheral surface 22 in the radial direction, closer to the center side of the axle shaft than the outer peripheral surface of the inner race 56 of the inner bearing 14. The spacer 92 has chamfered peripheral surfaces on a side of the outer peripheral surface thereof, although these chamfered peripheral surfaces are not shown. These chamfer surfaces correspond to the chamfered peripheral surfaces 69 of the first embodiment. Like the first embodiment, the spacer 92 has an inner peripheral surface that does not extend in parallel with the outer peripheral surface. In FIG. 7, the outer race 57 of the inner bearing 14 is not shown.

The hub structure according to the second embodiment of the present disclosure also offers the operational effects (1), and (3) to (6) of the first embodiment. In addition, the spacer of the second embodiment may be comparatively more compact than a spacer of the ring body, which contributes to reduction in weight of the hub structure.

The present disclosure is not limited to the embodiments described above but is intended to include any modifications equivalent in the scope and the essence of the present disclosure, as in the following examples.

In the above embodiments, the spacer is fitted to the hub with the clearance fit. However, fitting of the spacer to the hub is not limited to the clearance fit. The spacer may be fitted to the hub with an interference fit, for example. In this case, while the hub is removed from the axle housing, the spacer does not move away from the hub in the vehicle width direction, and presses against the inner race of the inner bearing in the direction that the inner race is pulled out of the axle housing (toward the outer side of the forklift). When the frictional force of the inner race against the axle housing is smaller than the frictional force of the spacer against the hub as seen in this case, the inner race is removed from the axle housing. Since the oil seal press-fitted in the hub is not removed, replacement of the oil seal is not required even when the hub is reassembled to the axle housing. The spacer may also be fitted to the hub with a transition fit.

In the second embodiment, three grooves are provided to the hub, and the spacer fittable to each of the grooves is provided. In this case, the number of grooves and the respective spacers is not limited to the three units. Any plural number of grooves and the respective spacers, such as two, may be used.

In the above embodiments, the inner peripheral surface of the spacer is sloped along the chamfered peripheral surface of the axle housing, but does not extend in parallel with the outer peripheral surface. However, the scope of the present disclosure is not limited to the embodiments described above. As long as a spacer has a portion in contact with the inner race of the inner bearing, the inner peripheral surface and the outer peripheral surface of the spacer may be parallel to each other.

What is claimed is:

1. A hub structure comprising:
   an axle housing;
   a hub having an insertion hole in a vehicle width direction through which the axle housing is inserted, wherein an axial center of the insertion hole is in the vehicle width direction;
   an inner bearing disposed between the hub and the axle housing in the insertion hole, and rotatably supporting the hub with respect to the axle housing; and
   an oil seal disposed between the hub and the axle housing in the insertion hole, on an inner side relative to the inner bearing in the vehicle width direction, wherein
   a spacer is provided between the inner bearing and the oil seal along a straight line parallel to the axial center in the insertion hole, so that the inner bearing, the spacer, and the oil seal are disposed in recited order along the vehicle width direction, and
   the spacer has an outer end surface that is contactable with an inner end surface of an inner race of the inner bearing.

2. The hub structure according to claim 1, wherein the spacer is a ring body having a through hole through which the axle housing is inserted.

3. The hub structure according to claim 1, wherein the spacer is fitted to the hub with a clearance fit.

4. The hub structure according to claim 1, wherein the spacer is fitted to the hub with an interference fit.

5. The hub structure according to claim 1, wherein
the hub has a plurality of grooves formed on a hub inner-peripheral wall that forms the insertion hole, at intervals in a circumferential direction, and
the spacer is fittable to each of the grooves.

6. The hub structure according to claim 1, wherein the oil seal includes:
- an outer annular portion that is in contact with the hub inner-peripheral wall forming the insertion hole;
- an inner annular portion that is in sliding contact with an outer peripheral wall of the axle housing; and
- an intermediate connection portion connecting one end of the outer annular portion with one end of the inner annular portion, and the spacer is oriented in such a manner that the spacer is contactable with the intermediate connection portion.

* * * * *